United States Patent [19]
Hiatt

[11] 3,920,147
[45] Nov. 18, 1975

[54] LATCHING LEG-HANDLE ASSEMBLY

[75] Inventor: Russell D. Hiatt, West Bend, Wis.

[73] Assignee: Dart Industries Inc., Los Angeles, Calif.

[22] Filed: Aug. 9, 1974

[21] Appl. No.: 495,937

[52] U.S. Cl............ 220/94 R; 16/110.5; 16/114 A; 220/69; 403/315
[51] Int. Cl.$^2$........................................ B65D 25/28
[58] Field of Search............... 220/94 R, 69; 24/232; 294/27 R; 16/114 A, 110.5; 403/321, 315; 407/321, 315

[56] References Cited
UNITED STATES PATENTS

| | | | |
|---|---|---|---|
| 1,217,640 | 2/1917 | Roebuck | 403/321 |
| 1,371,001 | 3/1921 | Schmidt | 16/114 A |
| 3,065,513 | 11/1962 | Warner et al. | 24/232 |
| 3,179,287 | 4/1965 | Richmeier, Jr. | 294/27 R |
| 3,209,939 | 10/1965 | Terry et al. | 16/110.5 |
| 3,547,307 | 12/1970 | Barker | 220/94 |

Primary Examiner—William Price
Assistant Examiner—Allan N. Shoap
Attorney, Agent, or Firm—Kenneth J. Hovet; Leigh B. Taylor; Paul R. Wylie

[57] ABSTRACT

A leg-handle assembly for a domestic utensil which may be attached or removed by rotation of a latch mechanism. The assembly includes a pair of legs with an interconnecting handle located adjacent the sides of a utensil. The legs are provided with a spur portion having an orifice therethrough and a latch rotatably mounted adjacent the orifice. Bosses extend from the utensil bottom and are adapted to pass through the orifices and become engaged by the latches for connection of the legs to the utensil.

5 Claims, 5 Drawing Figures

LATCHING LEG-HANDLE ASSEMBLY

BACKGROUND OF THE INVENTION

1. Field of the Invention

The present invention relates to a household utensil having a detachable handle and, more particularly, to a utensil having a removable leg-handle structure with a latching mechanism.

2. Description of the Prior Art

Typically prior art cooking utensils have been provided with insulating handles and legs to separate the hot cooking surface from the user, counter top or table. Other than for replacement, there was no strong interest in providing such utensils with detachable handles and/or legs. However, with the advent of the decorative, but more cumbersome, buffet-type handle structures, it became almost imperative to be able to remove such.

Removal of the utensil legs and/or handle structure serves to facilitate the storage of the utensil and allows one to clean the utensil outer surfaces and remove dirt and grease encrustments which commonly accumulate about the leg and handle structures. To accomplish this purpose, devices such as the screw and spring washer shown in U.S. Pat. No. 3,209,939, or the offset arm member captivated in the bottom of a skillet shown in U.S. Pat. No. 3,547,307 have been utilized. These prior art devices have found difficulty in that they either lack stability when engaged or they are difficult to remove for the average housewife.

A more intricate system which sought to alleviate the stability problem is shown in U.S. Pat. No. 3,685,092. This device required a matching plate assembly secured to the handle structure. Although this provided a means for securing the handle in a releasable yet stable fashion, the latching plates were difficult to clean and were frequently awkward in engagement for an untrained user.

SUMMARY OF THE INVENTION

The present invention sets forth a latching assembly which is extremely simple of use and yet provides a strong stable and effective means for the removable attachment of a leg-handle structure to a kitchen utensil. It requires no complicated instructions or maintanence and a housewife upon seeing such would likely know how to operate it.

In general, the system comprises a leg structure having a laterally extending support portion which extends beneath the utensil. The support portion is provided with an orifice adapted to closely engage a boss structure extending from the bottom of the utensil. A notched latch is pivotally secured to the support portion and located to engage the boss structure for attaching the leg to the utensil. Simple rotation of a latch for each leg structure is all that is required to remove and attach such to a cooking utensil, skillet, serving dish, buffet plate or the like.

DESCRIPTION OF THE PREFERRED EMBODIMENT

Figure 1:
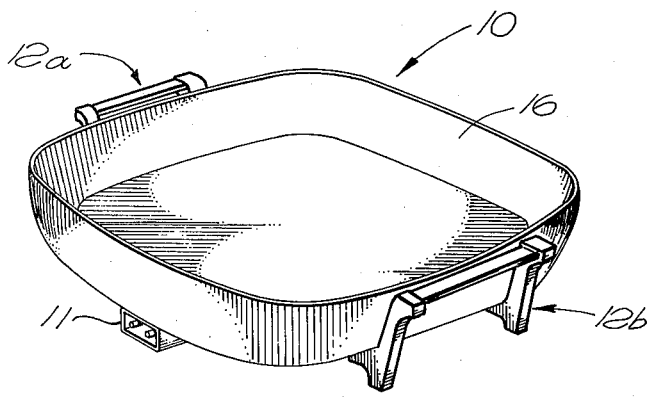
FIG. 1 is a top perspective view of an electric skillet incorporating the present invention.
Figure 2:
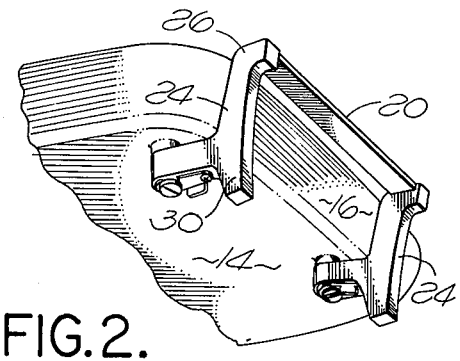
FIG. 2 is a fragmentary perspective view showing a bottom portion of the skillet of FIG. 1.

Referring now to the drawings, and, more particularly, to FIGS. 1 and 2 thereof, a household utensil in the form of an electric frying pan is shown at 10 having a pair of identical opposing leg-handle structures 12a and 12b. The frying pan 10 includes a bottom 14 and sidewalls 16. It will be noted that the bottom of electric skillets are typically provided with an electrical heating structure (not shown) coupled to electrical connection means depicted by reference numeral 11 in FIG. 1.

As best shown in FIG. 2, the leg-handle structure includes a handle portion 20, which extends laterally between a pair of leg portions 24. The leg portions include an upper portion 26, an end portion 30, and a lateral support portion 32. Preferably, the support portion extends from the leg at a location above the bottom of end portion 30 and below about the leg midpoint.

Figure 3:
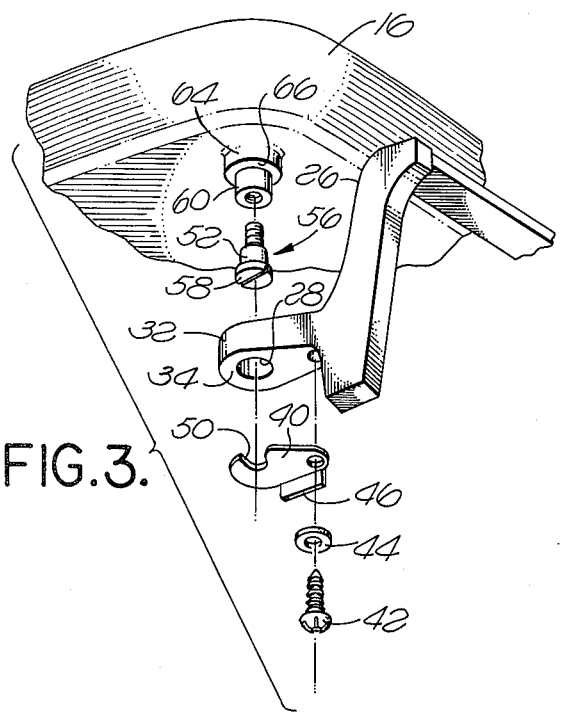
FIG. 3 is an exploded perspective partial view of the assembly of FIG. 2.
Figure 4:
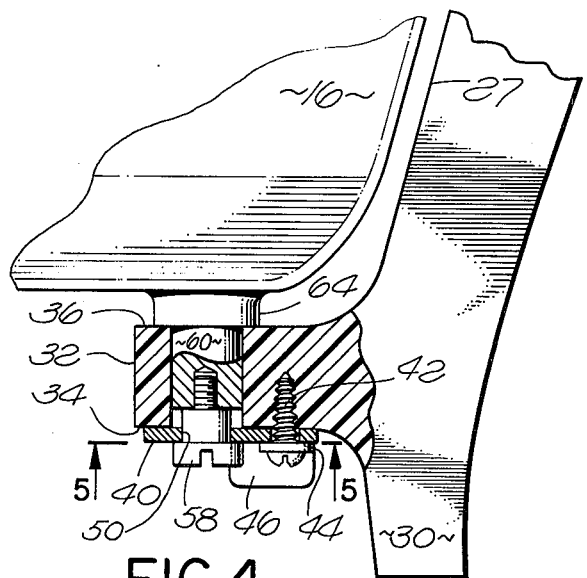
FIG. 4 is a broken-away partial section side elevation view of the assembly of FIG. 2; and, FIG. 5 is a plan view taken along the line 5—5 of FIG. 4.

Referring now to FIGS. 3 and 4 of the preferred embodiment, the support portion is provided with a first planar surface 34 and a second planar surface 36 and includes an orifice 28 extending therethrough. A latch 40 is pivotally mounted upon the first surface 34 by a fastening means comprising a screw 42 and washer 44. To facilitate the movement of the latch about the screw, the latch body includes a perpendicularly extending tab 46 extending from a back edge. The front edge of the latch is provided with a notch 50 sized to engage the shoulder 52 of connecting part 56. The connecting part includes a restraining means shown in the preferred embodiment as head portion 58. The head portion is larger than the notch 50 but is slightly smaller than the orifice 28. It must be smaller than the orifice so that it will pass therethrough and extend above surface 34 a predetermined distance.

The connecting part may be a shaft means such as a bolt, rod, screw or the like secured to bosses 60 and extending substantially perpendicularly from the bottom 14 of the frying pan. The bosses are located adjacent two opposing sidewalls 16 of the utensil and may be provided with attachment means such as internal threads for securing the connecting part thereto. It is to be understood that the connecting part and boss may be a single unitary upright member integral with the exterior surface of the utensil bottom and having all the described features of both. This embodiment, for example, may occur by welding the member to the utensil or it could be formed in the casting of the utensil.

The bosses 60 include a raised abutment member 64 which presents a mating annular planar leverage surface 66 for abutment with the support portion second planar surface 36. Because the annular abutment area 66 and second support surface 36 are planar and correspond to each other and are parallel to each other relative to the utensil bottom, a large area of contact results which serves to facilitate a wobble-free stable leg-to-utensil connection. It will be appreciated that the shoulder portion 52 of connection part 56 extends beyond the first support surface a distance about equal to the thickness of the latch 40. In this manner a tight wobble-free connection is further enhanced.

Figure 5:
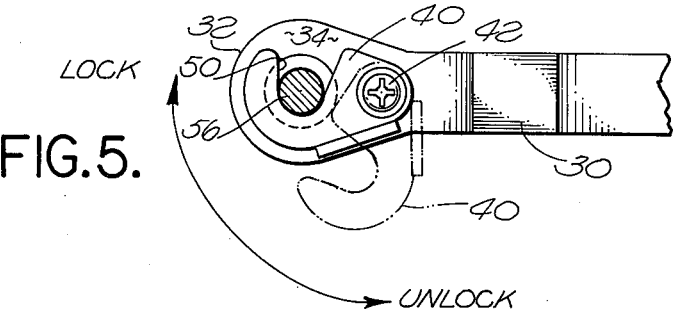

As depicted in FIG. 5, a user simply aligns the leg handle structure along a side of the utensil and inserts bosses 60 through orifices 28. The latches may then be rotated in the direction indicated by the arrow from the unlock position shown in phantom to the lock position. In the lock position the notch 50 will engage the shoulder 52. The notch opening is commensurate in size to the diameter of the shoulder 52, but is smaller than the diameter of the enlarged head portion 58. This, of course, prevents the latch from becoming disengaged. In place of the enlarged head 58, the connecting part may be notched or grooved to provide an effective engagement with notch 50. It will be appreciated that the diameter of boss 60 is only slightly less than the diameter of orifice 28. This feature, together with the flat surfaces 36 and 66 facilitate a wobble-free connection.

Another desirable feature of the present invention is effected by making the lateral distance between the approximate longitudinal axis of the support portion orifice 28 and leg portion 24 greater than the lateral distance between the longitudinal axis of the upright members and utensil sidewalls 16. The above relative dimensions will cause the inside surfaces 27 of the upper leg portion 26 to be spaced apart from the utensil sidewalls 16 when such are assembled. This represents a significant advantage in that the air space therebetween provides substantial insulation from the heat of the utensil. It also provides a more pleasing appearance.

With the above modifications and others that will be apparent to those skilled in the art, it is to be understood that the present invention is not to be limited by the specific illustrative embodiment but only by the scope of the appended claims.

What is claimed is:

1. A latching leg-handle assembly for a domestic utensil comprising:
    a utensil having spaced-apart upright members extending from a bottom surface adjacent a side thereof, said members each having a latch engagement means and comprise a raised abutment member having an annular planar surface from which extends a boss;
    a leg-handle structure including a pair of legs having a handle extending therebetween and a support portion extending laterally from each leg about below the midpoint thereof, said support portion including a planar surface adapted to contact said annular surface of said upright member when said leg-handle structure is latched to the utensil, said support portion further including an orifice through which an upright member may be inserted; and,
    a latch pivotally mounted on said support portion adjacent said orifice and adapted to engage the latch engagement means when an upright member is inserted through said orifice.

2. The assembly of claim 1 wherein each of said upright members includes a connecting part attached to the boss, said connecting part including said latch engagement means.

3. The assembly of claim 2 wherein said connecting part is a shaft means extending from said boss; and,
    said latch engagement means includes a shoulder portion extending above said boss and a restraining means for preventing said latch from becoming disengaged.

4. The assembly of claim 3 wherein said shaft means and latch engagement means comprise an integral shoulder bolt structure and said restraining means is an enlarged head portion, said head portion extending above the raised abutment surface a distance not less than about the thickness of the latch.

5. The assembly of claim 1 wherein the orifices through said support portions are laterally offset from the longitudinal axis of said legs a distance greater than the distance between said upright members and utensil sidewalls.

* * * * *